(12) United States Patent
Mori et al.

(10) Patent No.: US 10,965,242 B2
(45) Date of Patent: Mar. 30, 2021

(54) SOLAR POWER GENERATION DEVICE, METHOD FOR INSTALLING SOLAR POWER GENERATION DEVICE, AND METHOD FOR OPERATING SOLAR POWER GENERATION DEVICE

(71) Applicant: Sumitomo Electric Industries, Ltd., Osaka (JP)

(72) Inventors: Koji Mori, Osaka (JP); Takashi Iwasaki, Osaka (JP); Masao Moriguchi, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 67 days.

(21) Appl. No.: 15/577,979

(22) PCT Filed: Jun. 2, 2016

(86) PCT No.: PCT/JP2016/066371
§ 371 (c)(1),
(2) Date: Nov. 29, 2017

(87) PCT Pub. No.: WO2016/199664
PCT Pub. Date: Dec. 15, 2016

(65) Prior Publication Data
US 2018/0294766 A1 Oct. 11, 2018

(30) Foreign Application Priority Data
Jun. 10, 2015 (JP) .............................. JP2015-117273

(51) Int. Cl.
*H02S 20/32* (2014.01)
*F24S 30/452* (2018.01)
(Continued)

(52) U.S. Cl.
CPC ............ *H02S 20/32* (2014.12); *F24S 30/452* (2018.05); *F24S 40/85* (2018.05); *H02S 20/10* (2014.12);
(Continued)

(58) Field of Classification Search
CPC .......... H02S 20/32; H02S 20/10; H02S 40/22; H02S 20/30; F24S 30/452; F24S 40/85;
(Continued)

(56) References Cited

U.S. PATENT DOCUMENTS 5,622,078 A 4/1997 Mattson
9,443,999 B2 * 9/2016 Polk .................. H02S 10/40
(Continued)

FOREIGN PATENT DOCUMENTS

JP S29000079 B 1/1954
JP S34-3410 Y1 3/1959
(Continued)

OTHER PUBLICATIONS

Office Action dated Jun. 11, 2019 in the corresponding JP Patent Application No. 2015-117273.
(Continued)

*Primary Examiner* — Tony Ko
(74) *Attorney, Agent, or Firm* — Baker Botts L.L.P.; Michael A. Sartori

(57) ABSTRACT

A photovoltaic apparatus includes: a power generation part; an angle changeable mechanism configured to support the power generation part so as to be able to change an elevation of the power generation part; a post configured to support the power generation part and the angle changeable mechanism; and a hinge mechanism configured to support the post so as to be able to change an angle of the post relative to an installation surface for the photovoltaic apparatus.

2 Claims, 13 Drawing Sheets

(51) Int. Cl.
  *F24S 40/80* (2018.01)
  *H02S 20/10* (2014.01)
  *H02S 20/30* (2014.01)
  *H02S 40/22* (2014.01)
  *F24S 25/00* (2018.01)
  *F24S 30/00* (2018.01)

(52) U.S. Cl.
  CPC .............. *H02S 20/30* (2014.12); *H02S 40/22* (2014.12); *F24S 2025/01* (2018.05); *F24S 2025/012* (2018.05); *F24S 2025/014* (2018.05); *F24S 2030/115* (2018.05); *F24S 2030/16* (2018.05); *Y02E 10/52* (2013.01)

(58) Field of Classification Search
  CPC ............. F24S 2025/01; F24S 2025/014; F24S 2025/012; F24S 2030/16; F24S 2030/115; Y02E 10/52
  See application file for complete search history.

(56) References Cited

U.S. PATENT DOCUMENTS

| | | | |
|---|---|---|---|
| 9,496,822 B2 * | 11/2016 | Gerwing | ................. H02S 40/00 |
| 2008/0163921 A1 | 7/2008 | Leong et al. | |
| 2013/0250561 A1 | 9/2013 | Knodel | |
| 2014/0083480 A1 | 3/2014 | Gerwing | |
| 2014/0125134 A1 | 5/2014 | Van Straten | |

FOREIGN PATENT DOCUMENTS

| | | |
|---|---|---|
| JP | S60-045721 U | 3/1985 |
| JP | 62-137370 A | 6/1987 |
| JP | 3034016 U | 11/1996 |
| JP | H9-032345 A | 2/1997 |
| JP | 2003120056 A | 4/2003 |
| JP | 2003-322418 A | 11/2003 |
| JP | 2011-108854 A | 6/2011 |
| JP | 2013-529849 A | 7/2013 |
| WO | 2009/127758 A2 | 10/2009 |
| WO | 2012/073705 A1 | 6/2012 |

OTHER PUBLICATIONS

Notice of Reasons for Refusal issued in counterpart JP Patent Application No. 2015-11727 dated May 19, 2020.

Examination Report in counterpart European Application No. 16807371.6, dated Jul. 30, 2020.

* cited by examiner

SOLAR POWER GENERATION DEVICE, METHOD FOR INSTALLING SOLAR POWER GENERATION DEVICE, AND METHOD FOR OPERATING SOLAR POWER GENERATION DEVICE

TECHNICAL FIELD

The present invention relates to a photovoltaic apparatus, a method for installing the photovoltaic apparatus, and a method for operating the photovoltaic apparatus. This application claims priority based on Japanese Patent Application No. 2015-117273 filed on Jun. 10, 2015, the entire contents of which are incorporated herein by reference.

BACKGROUND ART

As one example of a photovoltaic apparatus, PATENT LITERATURE 1 (Japanese Laid-Open Patent Publication No. 2011-108854) discloses the following technology, for example. That is, disclosed is an installation structure of a photovoltaic apparatus including a solar cell panel provided at an upper part of a post standing on the ground, the solar cell panel having a light receiving surface thereof oriented to the sun, the solar cell panel being provided such that the angle thereof can be changed so as to cause the solar cell panel to take a substantially horizontal attitude when the wind speed value has exceeded a predetermined value, the installation structure including: an embedded structure body located below the post; and a fastener which couples an upper portion of the embedded structure body and a lower portion of the post. The embedded structure body is formed as a support cylinder being open at the upper end and the bottom end thereof. The embedded structure body has the outer periphery side thereof being embedded in the ground with concrete interposed therebetween. The embedded structure body has concrete provided also inside the support cylinder.

PATENT LITERATURE 2 (Japanese Laid-Open Patent Publication No. 2003-322418) discloses the following technology. That is, disclosed is a concentrating/tracking-type photovoltaic and hot-water supplying apparatus including a concentrating board and a support base portion, wherein the concentrating board includes: a frame bottom plate; a water-flowing frame laid on the upper face of the frame bottom plate; a solar cell sheet laid on the upper face of the water-flowing frame; an air-flowing frame laid on the upper face of the solar cell sheet; and a lens plate laid on upper face of the air-flowing frame. The concentrating/tracking-type photovoltaic and hot-water supplying apparatus is configured such that water or a cooling medium is supplied to the water-flowing frame for heat generated from cells of the solar cell sheet. The concentrating/tracking-type photovoltaic and hot-water supplying apparatus is also configured such that heat generated from the cells of the solar cell sheet is cooled by outside air in the air-flowing frame. The support base portion is configured to support the concentrating board so as to be always oriented to the sun.

CITATION LIST

Patent Literature

PATENT LITERATURE 1: Japanese Laid-Open Patent Publication No. 2011-108854

PATENT LITERATURE 2: Japanese Laid-Open Patent Publication No. 2003-322418

SUMMARY OF INVENTION

A photovoltaic apparatus according to the present disclosure includes: a power generation part; an angle changeable mechanism configured to support the power generation part so as to be able to change an elevation of the power generation part; a post configured to support the power generation part and the angle changeable mechanism; and a hinge mechanism configured to support the post so as to be able to change an angle of the post relative to an installation surface for the photovoltaic apparatus.

From a viewpoint of a method for installing a photovoltaic apparatus, the present disclosure includes: a step of laying a post sideways relative to an installation surface for the photovoltaic apparatus, the post having a hinge mechanism mounted thereto; a step of mounting a power generation part to the post laid sideways; and a step of rotating the post by the hinge mechanism, to cause the post to stand.

From a viewpoint of a method for operating a photovoltaic apparatus, the present disclosure includes: a step of, in a state where a post having a hinge mechanism mounted thereto and supporting a power generation part stands at an installation surface for the photovoltaic apparatus, and when a weather satisfies a predetermined withdrawal condition, rotating the post by the hinge mechanism so as to cause the post to be laid sideways relative to the installation surface; and a step of, when the weather satisfies a predetermined restoration condition, rotating, by the hinge mechanism, the post having been laid sideways so as to cause the post to stand at the installation surface.

DESCRIPTION OF EMBODIMENTS

Technical Problem

Figure 1:
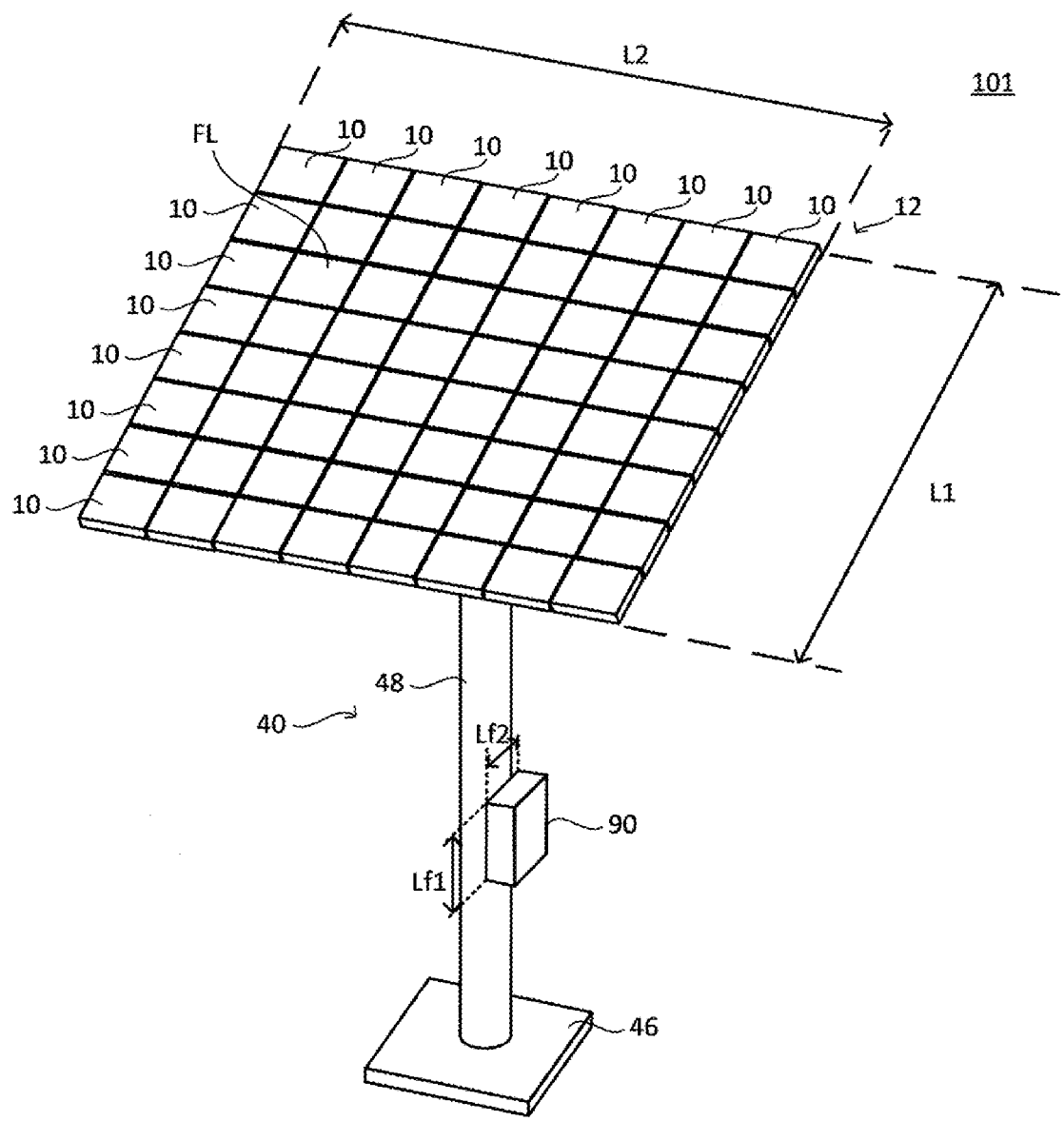
FIG. 1 is a perspective view of a photovoltaic apparatus according to an embodiment of the present invention.

The light receiving surface of a photovoltaic panel has large sides of several meters, for example, and also has a large weight. Thus, when a photovoltaic apparatus is to be installed, it is difficult to carry an assembled photovoltaic panel from a factory to an installation site by a truck or the like. Thus, the photovoltaic panel is assembled at the installation site in many cases.

In the case of a photovoltaic apparatus in which a power generation part is supported by a post, such as in the photovoltaic apparatuses described in PATENT LITERATURE 1 and 2, it is necessary to use a machine such as a crane in order to mount, to an upper portion of the post, a photovoltaic panel which has been assembled at an installation site and which is to serve as the power generation part. This requires a long work time. Thus, the work cost and the machine procurement cost are increased.

In addition, in the technology described in PATENT LITERATURE 1, when the wind speed has exceeded a predetermined value, the angle of the photovoltaic panel is changed so that the photovoltaic panel takes a substantially horizontal attitude, whereby influence of wind pressure is reduced.

However, in the case of the photovoltaic apparatus described in PATENT LITERATURE 1, since the photovoltaic panel is mounted to an upper portion of the post, merely causing the photovoltaic panel to take a substantially horizontal attitude may not provide sufficient protection in some cases.

The present disclosure has been made in order to solve the above problems. An object of the present disclosure is to provide a photovoltaic apparatus, a method for installing the photovoltaic apparatus, and a method for operating the photovoltaic apparatus that can realize simplification of installation work or stable operation in a configuration in which a power generation part is supported by a post.

Advantageous Effects of the Present Disclosure

According to the present disclosure, simplification of installation work and stable operation can be realized in a configuration in which the power generation part is supported by the post.

SUMMARY OF EMBODIMENTS

Summary of embodiments of the present invention includes at least the following.

(1) A photovoltaic apparatus according to an embodiment of the present invention includes: a power generation part; an angle changeable mechanism configured to support the power generation part so as to be able to change an elevation of the power generation part; a post configured to support the power generation part and the angle changeable mechanism; and a hinge mechanism configured to support the post so as to be able to change an angle of the post relative to an installation surface for the photovoltaic apparatus.

This configuration allows the inclination angle of the post to be changed and also allows the elevation of the power generation part to be changed. Thus, the position at which the post and the power generation part are laid sideways relative to the installation surface, and the position at which the post and the power generation part are caused to stand can be easily taken. Accordingly, for example, in a state of a power generation module having a size easy to handle, a necessary number of the power generation modules are carried to an installation site, and then, the power generation modules are assembled at the post laid sideways relative to the installation surface. Thus, the power generation part can be easily mounted to the post without using a large crane and the like. In addition, for example, from the assembling of the power generation part to the mounting of the power generation part to the angle changeable mechanism mounted to the post can be performed at once at the installation site. That is, the photovoltaic apparatus does not require large machines and heavy equipment which have been necessary for loading the entirety of the power generation part to the post. In addition, for example, in a case where the entirety of the power generation part is completed at a factory, the power generation part can be mounted to the post laid sideways relative to the installation surface, by use of a small crane, a forklift, and the like which perform unloading from a truck. Thus, with the photovoltaic apparatus, the load at the construction work and the load at the assembling work during installation can be reduced. In addition, during maintenance such as module replacement, heavy equipment such as a crane and a vehicle for work at height are not required.

By use of the hinge mechanism and the angle changeable mechanism, the power generation part and the post can be lowered to the installation surface such as the ground surface, to be laid sideways, for example. That is, by causing the power generation part supposed to be several meters or more above the ground surface, for example, to be horizontally disposed at the ground surface, it is possible to cause the power generation part to be withdrawn into a state where breakage thereof is less likely to occur. Accordingly, damage by strong wind can be avoided. Then, after the strong wind has gone, the state can be restored to the original operation state, by rotating the post by means of the hinge mechanism and by adjusting the angle by means of the angle changeable mechanism. As described above, during a storm, the power generation part can be laid sideways relative to the installation surface in a short time, and after the storm has gone, the state can be quickly restored to the operation state. Thus, loss in power generation of the photovoltaic apparatus can be suppressed at minimum.

Thus, with the photovoltaic apparatus according to the embodiment of the present invention, simplification of installation work and stable operation can be realized in a configuration in which the power generation part is supported by the post.

(2) Preferably, the photovoltaic apparatus further includes a base provided at the installation surface, and the hinge mechanism is provided between a lower portion of the post and the base.

With this configuration, the hinge mechanism can be provided at an appropriate position in the photovoltaic apparatus, and the function of the hinge mechanism can be exerted in better ways.

(3) Preferably, the power generation part has a light receiving surface, and the photovoltaic apparatus further includes a tracking control section configured to perform control by use of the angle changeable mechanism such that the light receiving surface is oriented to a direction of the sun.

With this configuration, the tracking mechanism of the power generation part provided for the purpose of increasing the power generation amount can be used also for the purpose of realizing simplification of installation work and stable operation, and thus, can be used effectively.

(4) Preferably, the photovoltaic apparatus further includes an expansion/contraction mechanism capable of expanding/contracting along a direction of displacement of the post caused by the hinge mechanism, the expansion/contraction mechanism configured to support the post.

With this configuration, the inclination angle of the post can be easily set to any angle. In addition, for example, the post and the power generation part can be easily caused to stand from a state where the post and the power generation part are laid sideways relative to the installation surface.

(5) A method for installing a photovoltaic apparatus according to the embodiment of the present invention includes: a step of laying a post sideways relative to an installation surface for the photovoltaic apparatus, the post having a hinge mechanism mounted thereto; a step of mounting a power generation part to the post laid sideways; and a step of rotating the post by the hinge mechanism, to cause the post to stand.

Thus, by changing the inclination angle of the post, a position at which the post is laid sideways relative to the installation surface, and a position at which the post is caused to stand can be easily taken. Accordingly, for example, in a state of a power generation module having a size easy to handle, a necessary number of the power generation modules are carried to an installation site, and then, the power generation modules are assembled at the post laid sideways relative to the installation surface. Thus, the power generation part can be easily mounted to the post without using a large crane and the like. In addition, for example, from the assembling of the power generation part to the mounting of the power generation part to the angle changeable mechanism mounted to the post can be performed at once at the installation site. That is, the photovoltaic apparatus does not require large machines and heavy equipment which have been necessary for loading the entirety of the power generation part to the post. In addition, for example, in a case where the entirety of the power generation part is completed at a factory, the power generation part can be mounted to the post laid sideways relative to the installation surface, by use of a small crane, a forklift, and the like which perform unloading from a truck. Thus, with the photovoltaic apparatus, the load at the construction work and the load at the assembling work during installation can be reduced. In addition, during maintenance such as module replacement, heavy equipment such as a crane and a vehicle for work at height are not required. Therefore, with the method for installing the photovoltaic apparatus according to the embodiment of the present invention, simplification of installation work can be realized in a configuration in which the power generation part is supported by the post.

(6) A method for operating the photovoltaic apparatus according to the embodiment of the present invention includes: a step of, in a state where a post having a hinge mechanism mounted thereto and supporting a power generation part stands at an installation surface for the photovoltaic apparatus, and when a weather satisfies a predetermined withdrawal condition, rotating the post by the hinge mechanism so as to cause the post to be laid sideways relative to the installation surface; and a step of, when the weather satisfies a predetermined restoration condition, rotating, by the hinge mechanism, the post having been laid sideways so as to cause the post to stand at the installation surface.

Thus, by changing the inclination angle of the post, a position at which the post is laid sideways relative to the installation surface, and a position at which the post is caused to stand can be easily taken. By use of the hinge mechanism, the power generation part and the post can be lowered to the installation surface such as the ground surface, for example. That is, by causing the power generation part supposed to be several meters or more above the ground surface, for example, to be disposed near the ground surface, it is possible to cause the power generation part to be withdrawn into a state where breakage thereof is less likely to occur. Accordingly, damage by strong wind can be avoided. Then, after the strong wind has gone, the state can be restored to the original operation state by rotating the post by means of the hinge mechanism. As described above, during a storm, the power generation part can be moved to the vicinity of the installation surface in a short time, and after the storm has gone, the state can be quickly restored to the operation state. Accordingly, loss in power generation of the photovoltaic apparatus can be suppressed at minimum. Thus, with the method for operating the photovoltaic apparatus according to the embodiment of the present invention, stable operation can be realized in a configuration in which the power generation part is supported by the post.

Details of Embodiments

In the following, an embodiment of the present invention is described with reference to the drawings. In the drawings, the same or corresponding parts are denoted by the same reference signs and description thereof is not repeated. At least some parts of the embodiment described below may be combined together as desired.

Figure 2:
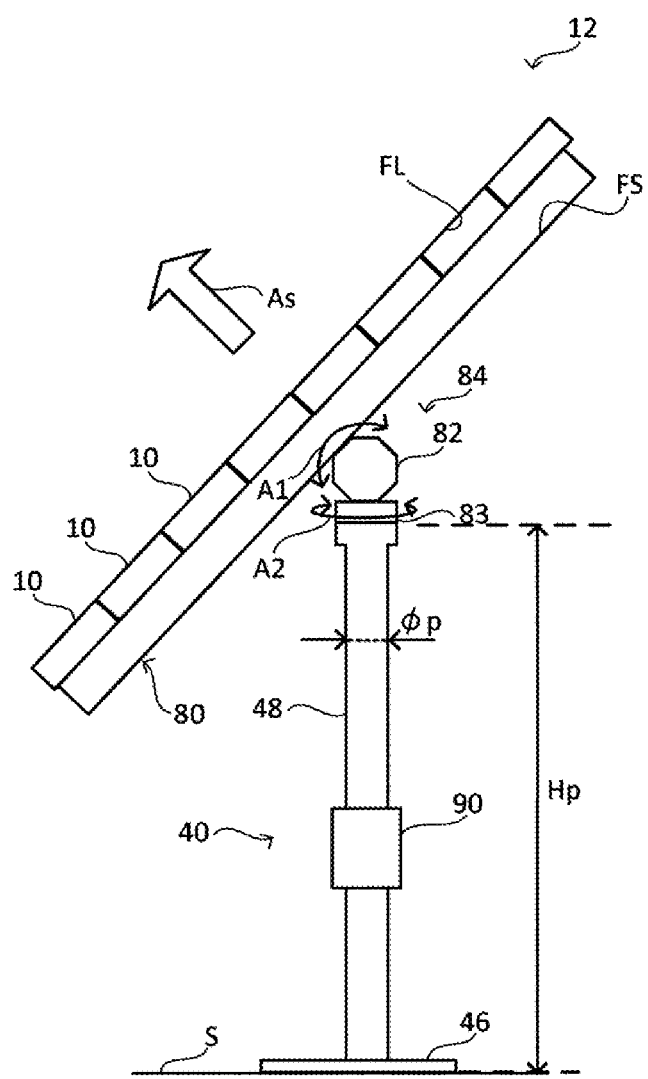
FIG. 2 is a side view of the photovoltaic apparatus according to the embodiment of the present invention.

FIG. 1 is a perspective view of a photovoltaic apparatus according to an embodiment of the present invention. FIG. 2 is a side view of the photovoltaic apparatus according to the embodiment of the present invention.

With reference to FIG. 1 and FIG. 2, a photovoltaic apparatus 101 includes a photovoltaic panel (power generation part) 12, a pedestal 40, a position changeable part 84, and a function box 90. The photovoltaic panel 12 includes a plurality of power generation modules 10, a sun direction sensor not shown, and a frame part 80. The position changeable part 84 includes an elevation drive part 82 and an azimuth drive part 83. The pedestal 40 includes a base 46 and a post 48. The photovoltaic panel 12 includes a light receiving surface FL for receiving sunlight, and a back surface FS which is the surface opposite to the light receiving surface FL.

The photovoltaic panel 12 has a plate-like shape as a whole, for example. Here, the photovoltaic panel 12 has a quadrangular shape, for example, and includes 8 lines by 8 rows of the power generation modules 10, that is, 64 power generation modules 10 in total. The power generation modules 10 are mounted in lines and rows at an upper portion of the frame part 80. Each power generation module 10 receives sunlight to generate power, and outputs, by using a wire not shown, direct-current power which is the generated power, to the function box 90 mounted on a side face of the post 48.

The photovoltaic panel 12 is mounted, at the back surface FS side thereof, to the position changeable part 84. That is, the position changeable part 84 supports the photovoltaic panel 12 at the back surface FS side thereof. It should be noted the photovoltaic panel 12 may be mounted to the position changeable part 84 with a member interposed therebetween.

The post 48 supports the photovoltaic panel 12 and the position changeable part 84. The post 48 is provided to the base 46 provided at an installation surface S, for example, such that the post 48 stands perpendicular to the installation surface S. In FIG. 1 and FIG. 2, the shape of the post 48 is a cylindrical shape, but may be another shape such as a quadrate.

The position changeable part 84 is mounted to the distal end of the post 48, for example. On the basis of a control signal from the function box 90, the position changeable part 84 operates such that the light receiving surface FL of the photovoltaic panel 12 tracks the sun from the sunrise to sunset, with the direction of the light receiving surface FL, i.e., the direction of the normal line of the light receiving surface FL indicated by an arrow As, oriented to the sun.

The elevation drive part 82 of the position changeable part 84 has an angle changeable mechanism, and supports the photovoltaic panel 12 so as to be able to change the elevation of the photovoltaic panel 12. Specifically, for example, the elevation drive part 82 includes a motor and is inclined as indicated by an arrow A1, thereby driving the photovoltaic panel 12 in the elevation direction.

The azimuth drive part 83 is provided below the elevation drive part 82, and can change the azimuth of the photovoltaic panel 12. Specifically, for example, the azimuth drive part 83 includes a motor, and causes the elevation drive part 82 to rotate in the horizontal direction as indicated by an arrow A2, thereby driving the photovoltaic panel 12 in the azimuth direction.

The sun direction sensor not shown is used in order to detect the direction of the sun, and outputs to the function box 90 a sensor signal indicating the detection result.

The function box 90 provides functions regarding the photovoltaic apparatus 101. Specifically, for example, the function box 90 includes a housing and various units accommodated in the housing. More specifically, for example, the housing accommodates, as the units that provide functions regarding the photovoltaic apparatus 101, at least one of: a connection box which connects wires from the respective power generation modules 10 with each other; a power conditioner which converts direct-current power outputted from the power generation modules 10, into alternating-current power; a control unit (tracking control section) for controlling the orientation of the light receiving surface FL of the photovoltaic panel 12 by use of the position changeable part 84; a monitoring circuit for indicating the operation state of the photovoltaic apparatus 101; a safety circuit; measuring devices such as a thermometer; and a data logger.

A length L1 in the lengthwise direction and a length L2 in the widthwise direction of the photovoltaic panel 12 are each 5 m to 12 m, for example. A height Hp of the post 48 is 3 m to 6 m, for example. A length Lf1 in the direction perpendicular to the installation surface S of the face at the post 48 side of the function box 90 and a length Lf2 in the direction parallel to the installation surface S of the face at the post 48 side of the function box 90 are each 1 m, for example. A diameter ϕp of the post 48 is 0.2 m to 1 m, for example. The weight of the photovoltaic panel 12 is 500 kg to 2000 kg, for example. The weight of the function box 90 is 100 kg, for example.

Figure 3:
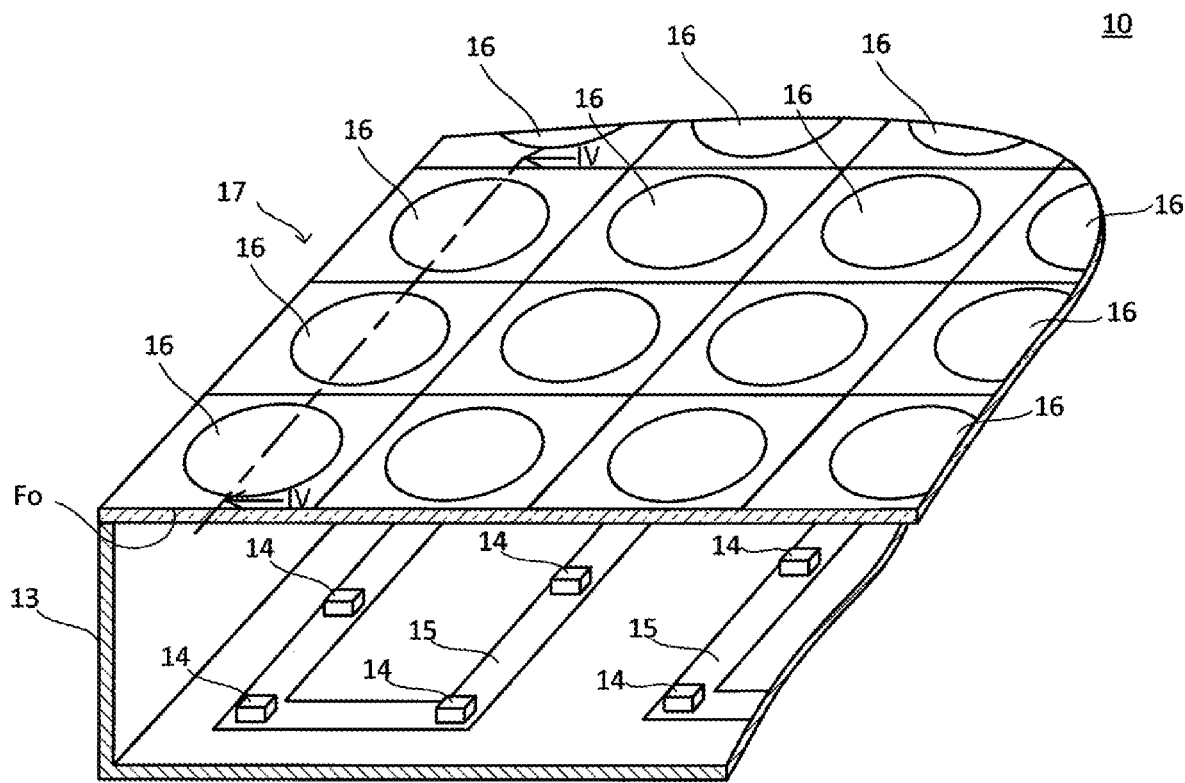
FIG. 3 is a diagram showing a configuration of a photovoltaic module in a photovoltaic panel of the photovoltaic apparatus according to the embodiment of the present invention.
Figure 4:
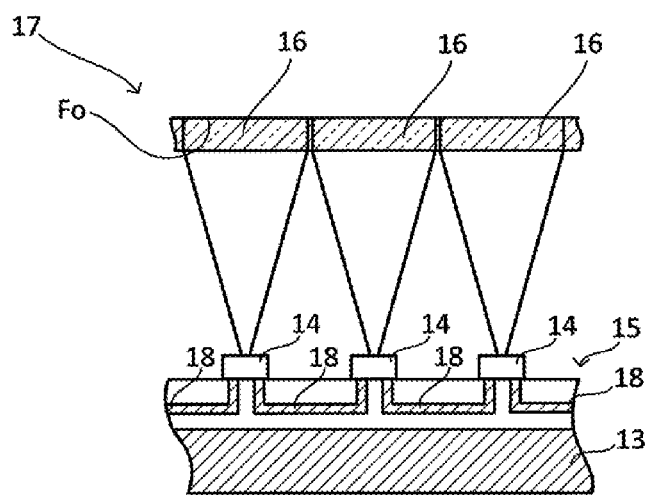
FIG. 4 is a cross-sectional view showing a cross-section along a line IV-IV in FIG. 3 of the photovoltaic module in the photovoltaic panel of the photovoltaic apparatus according to the embodiment of the present invention.

FIG. 3 is a diagram showing a configuration of the photovoltaic module in the photovoltaic panel of the photovoltaic apparatus according to the embodiment of the present invention. FIG. 4 is a cross-sectional view showing a cross-section, along the line IV-IV in FIG. 3, of the photovoltaic module in the photovoltaic panel of the photovoltaic apparatus according to the embodiment of the present invention.

The photovoltaic apparatus 101 is a concentrator photovoltaic apparatus, for example. In the concentrator photovoltaic apparatus, sunlight is converged onto power generating elements by use of lenses and the like, thereby increasing power generation efficiency of the power generating elements.

Specifically, with reference to FIG. 3 and FIG. 4, each power generation module 10 includes: a housing 13, a plurality of power generating elements 14, a flexible printed circuit (FPC) 15, and a light receiving part 17. The light receiving part 17 includes a plurality of Fresnel lenses 16. The flexible printed circuit 15 includes a conductive part 18.

The light receiving part 17 receives sunlight at the main surface Fo which is at the outer side of the housing 13. In the light receiving part 17, the Fresnel lenses 16 are arranged in a square lattice pattern, for example. Specifically, the Fresnel lenses 16 are arranged such that the distances between the centers of the Fresnel lenses 16 that are adjacent to each other are equal. Each Fresnel lens 16 converges, to its corresponding power generating element 14, sunlight perpendicularly arriving at the main surface Fo of the light receiving part 17. The light receiving part 17 is fixed so as to be spaced from and in parallel to the bottom of the housing 13.

Each power generating element 14 is positioned on the optical axis of its corresponding Fresnel lens 16, and receives sunlight converged by its corresponding Fresnel lens 16, to generate power in accordance with the amount of the received light. The power generating element 14 is formed by a compound semiconductor, for example.

Each power generating element 14 is mounted to the flexible printed circuit 15 having a strip shape. Power generating elements 14 that are adjacent to each other on the flexible printed circuit 15 are connected to each other by the conductive part 18 included in the flexible printed circuit 15, for example. Power generated at each power generating element 14 is outputted to the outside of the power generation module 10 through the conductive part 18.

The size of each Fresnel lens 16 is 50 mm×50 mm, for example. The size of each power generating element 14 is 3.2 mm×3.2 mm, for example.

Here, for example, the light receiving surface FL shown in FIG. 1 and FIG. 2 is an assembly of the main surfaces Fo in the light receiving part 17 of each power generation module 10 of the photovoltaic panel 12. Each main surface Fo may be flat or uneven.

Figure 5:
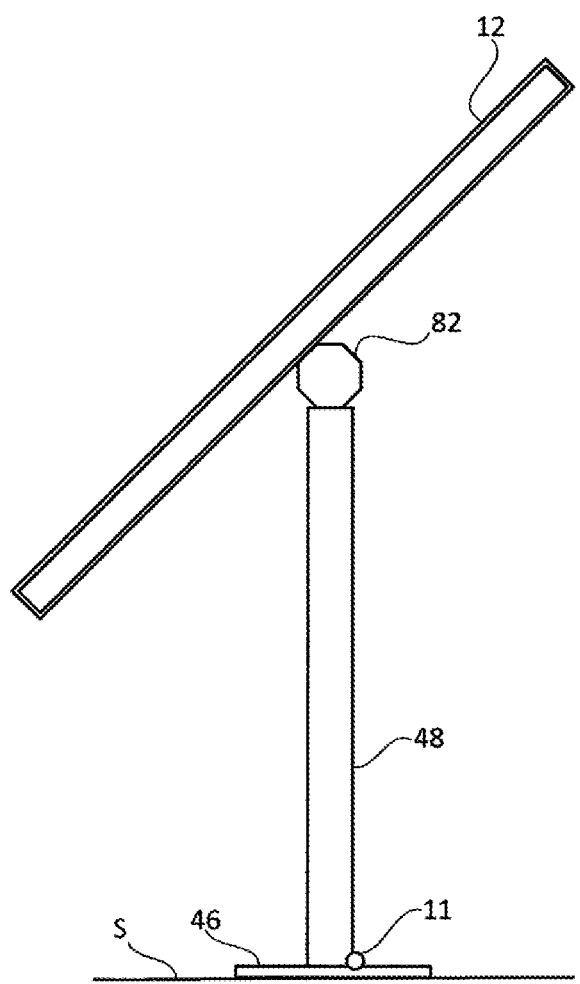
FIG. 5 is a side view schematically showing a movable mechanism of the photovoltaic apparatus according to the embodiment of the present invention.

FIG. 5 is a side view schematically showing a movable mechanism of the photovoltaic apparatus according to the embodiment of the present invention. In order to facilitate description, in the drawings described below including FIG. 5, some components of the photovoltaic apparatus 101 are not shown in some cases.

With reference to FIG. 5, the photovoltaic apparatus 101 further includes a hinge mechanism 11. The hinge mechanism 11 supports the post 48 so as to be able to change the angle of the post 48 relative to the installation surface S for the photovoltaic apparatus 101. More specifically, for example, the hinge mechanism 11 can change the inclination angle of the post 48 in a range from perpendicular to horizontal, i.e., the hinge mechanism 11 can change the angle of the post 48 relative to the installation surface S in a range of 90 degrees to 180 degrees.

For example, the hinge mechanism 11 is provided between the post 48 and the base 46. More specifically, the hinge mechanism 11 couples and rotates the post 48 and the base 46 together, thereby displacing the post 48.

For example, the hinge mechanism 11 is provided between a lower portion of the post 48 and the base 46. The hinge mechanism 11 is provided at a position in a lower end portion of the post 48, the position being at the opposite side to the position where the photovoltaic panel 12 and the elevation drive part 82 are connected to each other.

Figure 6:
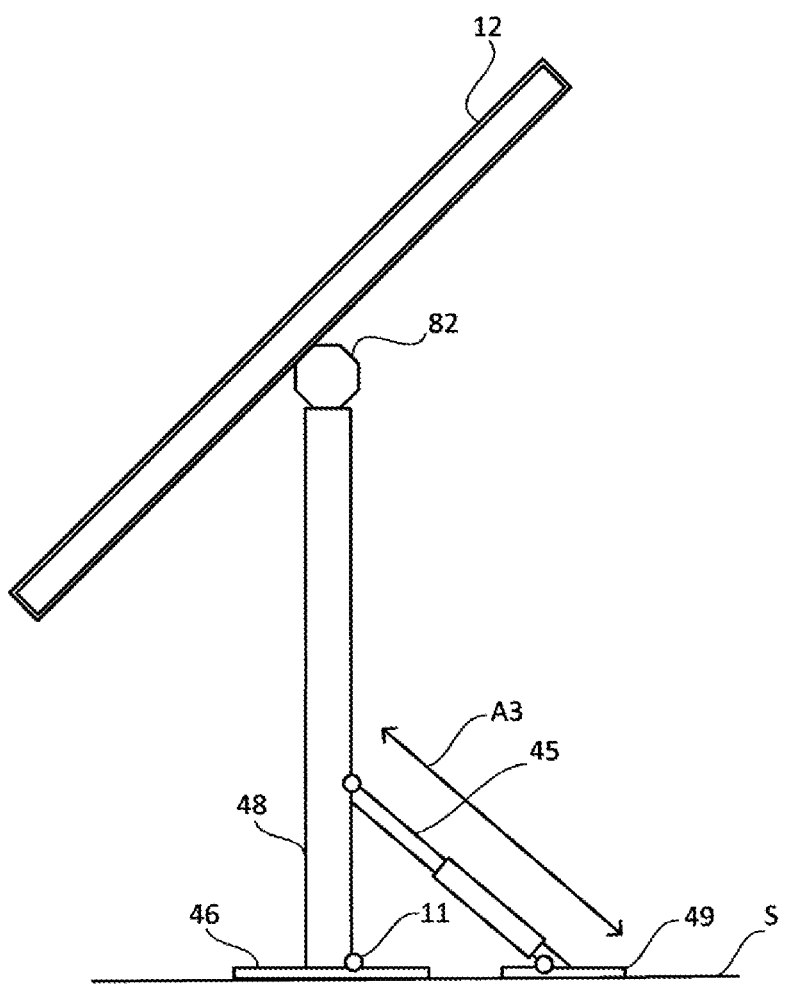
FIG. 6 is a diagram schematically showing a configuration of a modification of the photovoltaic apparatus according to the embodiment of the present invention.

FIG. 6 is a diagram schematically showing a configuration of a modification of the photovoltaic apparatus according to the embodiment of the present invention.

With reference to FIG. 6, the modification of the photovoltaic apparatus 101 further includes an expansion/contraction mechanism 45 and a base 49, compared with the photovoltaic apparatus 101.

The expansion/contraction mechanism 45 is a power cylinder or a linear actuator, for example. The expansion/contraction mechanism 45 has a first end thereof connected to the post 48, and a second end thereof connected to the base 49 provided at the installation surface S. As indicated by an arrow A3, the expansion/contraction mechanism 45 is capable of expanding/contracting along the direction of displacement of the post 48 caused by the hinge mechanism 11, and supports the post 48. By expanding/contracting, the expansion/contraction mechanism 45 can change the rotation position of the hinge mechanism 11.

With the configuration using the expansion/contraction mechanism 45, the inclination angle of the post 48 can be set to any angle automatically, for example.

[Method for Installing Photovoltaic Apparatus]

Figure 7:
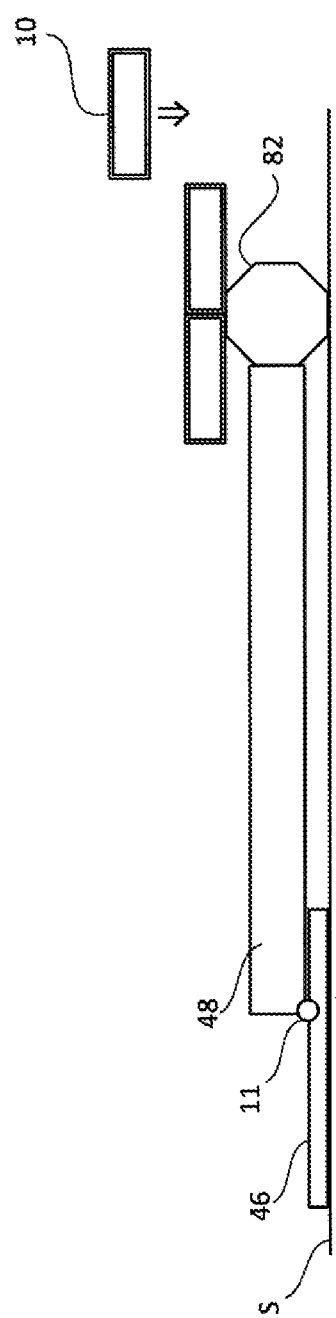
FIG. 7 is a diagram for describing assembling of the photovoltaic panel, in a method for installing the photovoltaic apparatus according to the embodiment of the present invention.

FIG. 7 is a diagram for describing assembling of the photovoltaic panel, in a method for installing the photovoltaic apparatus according to the embodiment of the present invention.

Figure 8:
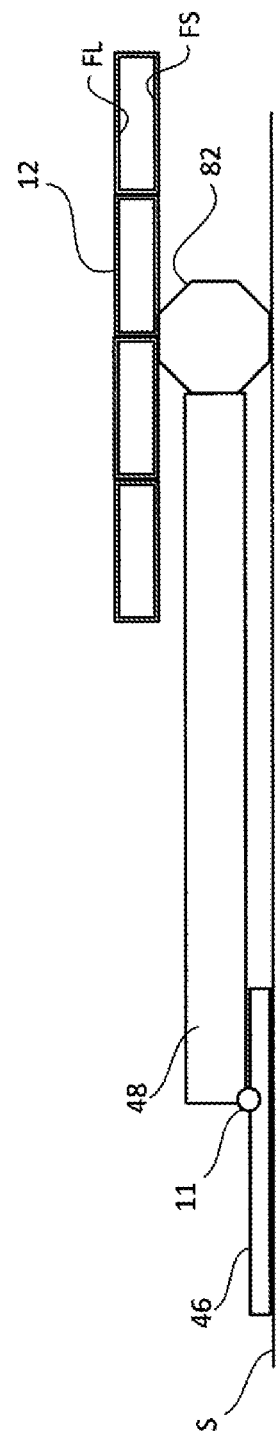
FIG. 8 is a diagram showing a state where the assembling of the photovoltaic panel has been completed, in the method for installing the photovoltaic apparatus according to the embodiment of the present invention.

FIG. 8 is a diagram showing a state where the assembling of the photovoltaic panel has been completed, in the method for installing the photovoltaic apparatus according to the embodiment of the present invention.

Figure 9:
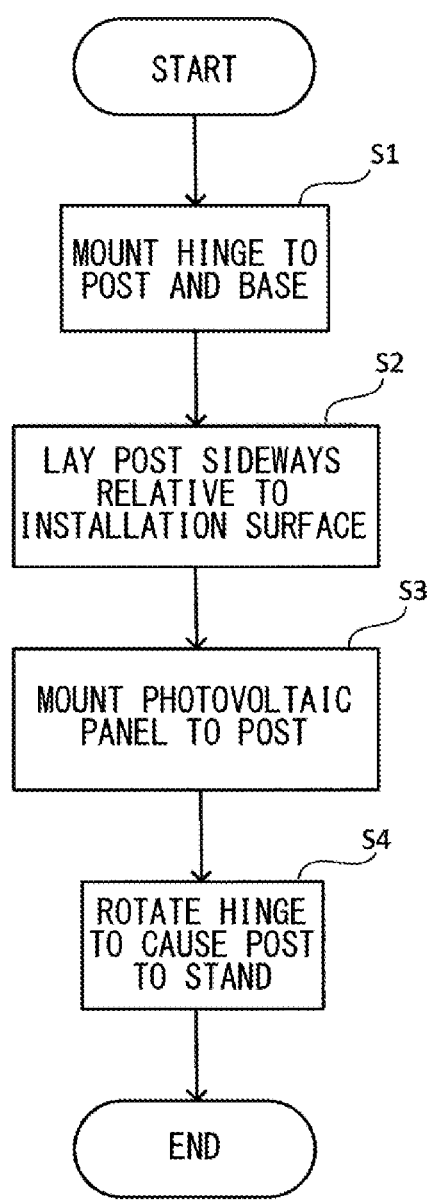
FIG. 9 is a flow chart showing one example of the procedure of the method for installing the photovoltaic apparatus according to the embodiment of the present invention.

FIG. 9 is a flow chart showing one example of the procedure of the method for installing the photovoltaic apparatus according to the embodiment of the present invention.

With reference to FIG. 7 and FIG. 9, first, the hinge mechanism 11 is mounted to the post 48 and the base 46 (step S1).

Next, the post 48 having the hinge mechanism 11 mounted thereto is laid sideways relative to the installation surface S, i.e., disposed horizontally relative to the installation surface S. Due to the hinge mechanism 11, the post 48 and the base 46 can have a positional relationship as shown in FIG. 7. For example, the elevation drive part 82 mounted to the distal end of the post 48 also enters a state in which the elevation drive part 82 is located at the installation surface S (step S2).

Next, the photovoltaic panel 12 is mounted to the post 48. More specifically, the frame part 80 not shown is mounted to the elevation drive part 82 of the position changeable part 84 mounted to the distal end of the post 48, and then, a plurality of the power generation modules 10 are arranged in the frame part 80. Accordingly, as shown in FIG. 8, a state is established in which the photovoltaic panel 12 is located such that the light receiving surface FL and the back surface FS are in parallel to the installation surface S, above the elevation drive part 82 and the post 48 (step S3).

Figure 10:
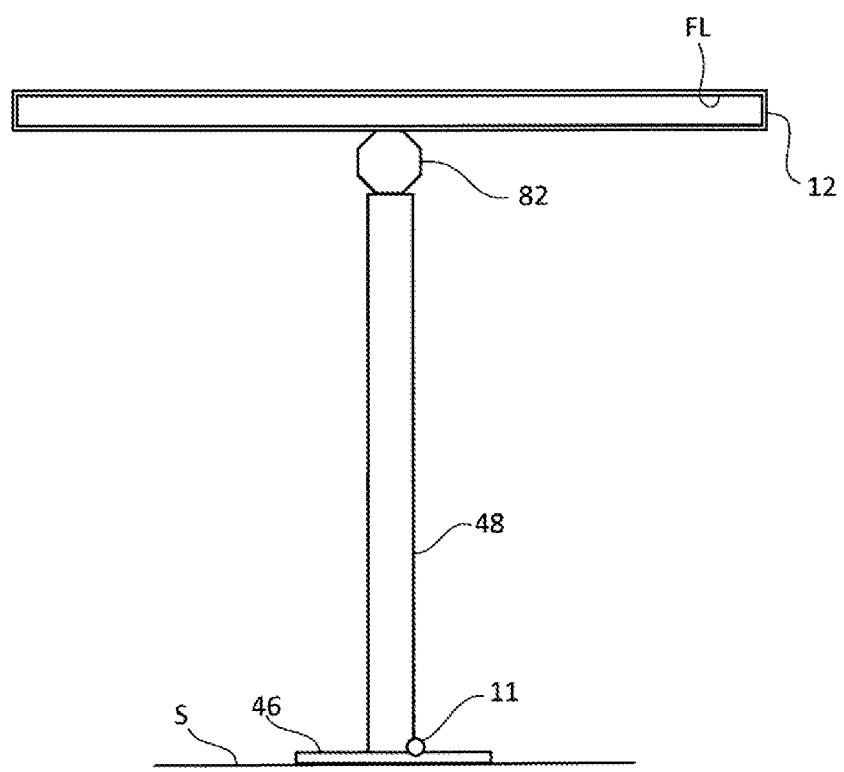
FIG. 10 is a diagram showing a state in which the photovoltaic panel has been caused to stand together with the post, in the method for installing the photovoltaic apparatus according to the embodiment of the present invention.

FIG. 10 is a diagram showing a state in which the photovoltaic panel has been caused to stand together with the post, in the method for installing the photovoltaic apparatus according to the embodiment of the present invention.

With reference to FIG. 9 and FIG. 10, next, the hinge mechanism 11 is rotated, whereby the post 48 having the photovoltaic panel 12 mounted thereto is caused to stand. At this time, the elevation drive part 82 locates the photovoltaic panel 12 at a horizontal position at which, in a side view of the photovoltaic apparatus 101, the longitudinal direction of the photovoltaic panel 12 is parallel to the installation surface S. In this state, for example, the angle between the extending direction of the post 48, and the longitudinal direction of the photovoltaic panel 12 and the installation surface S is 90 degrees (step S4).

Here, as a method for pulling up the photovoltaic panel 12, the photovoltaic panel 12 may be pulled up together with the post 48 by human power, or may be pulled up by using a simple winch or the like. In any case, large machines such as a large crane and heavy equipment are not required.

In addition, when the expansion/contraction mechanism 45 as shown in FIG. 6 is used, pulling up of the photovoltaic panel 12 is further facilitated.

In the photovoltaic apparatus 101, the angle of the photovoltaic panel 12, i.e., the elevation and the azimuth of the photovoltaic panel 12, can be freely adjusted by the position changeable part 84, and thus, such work can be more easily performed.

As described above, in the case of the photovoltaic apparatus 101, for example, in a state of the power generation module 10 having a size easy to handle, a necessary number of the power generation modules 10 are carried to an installation site. Then, the power generation modules 10 are assembled at the post 48 laid sideways relative to the installation surface S, specifically, at the position changeable part 84 mounted to the post 48. Thus, the photovoltaic panel 12 can be easily mounted to the post 48 without using a large crane and the like. That is, from the assembling of the photovoltaic panel 12 to the mounting of the photovoltaic panel 12 to the position changeable part 84 mounted to the post 48 can be performed at once.

It should be noted that the photovoltaic panel 12 assembled at a factory may be carried to an installation site in a state where the photovoltaic panel 12 is horizontally laid, and then, the photovoltaic panel 12 may be mounted to the position changeable part 84 mounted to the post 48.

That is, the photovoltaic apparatus 101 does not require large machines and heavy equipment which have been necessary for loading the entirety of the photovoltaic panel 12 to the post 48. In addition, in a case where the entirety of the photovoltaic panel 12 is completed at a factory, the photovoltaic panel 12 can be mounted to the post 48 laid sideways relative to the installation surface S, by use of a small crane, a forklift, and the like which perform unloading from a truck.

[Method for Operating Photovoltaic Apparatus]

There are cases where the photovoltaic apparatus 101 is installed in a desert region and the like where the amount of solar radiation is large throughout a year. In such a region, there is a possibility that intense storms and sandstorms break the photovoltaic panel 12.

Thus, for example, as in the technology described in PATENT LITERATURE 1, a method is conceivable in which: when the wind speed has exceeded a predetermined value, the angle of the photovoltaic panel is changed so that the photovoltaic panel takes a substantially horizontal attitude, whereby the photovoltaic panel 12 is supported at the horizontal position, and the wind pressure is reduced.

However, especially, with a configuration where the photovoltaic panel 12 is mounted to an upper portion of the post 48, in a case of a storm, for example, there is a high possibility that the photovoltaic panel 12 is damaged because the higher from the ground the position is, the higher the wind pressure is, and the more turbulent flows occur, in general.

In addition, the post 48 also receives strong force which is caused not only by direct wind but also by combination of moment and the like due to wind pressure received by the photovoltaic panel 12.

Thus, the photovoltaic apparatus 101 provides an excellent function that can handle such a situation, through the following method for operating the photovoltaic apparatus 101 employing the configuration as described above.

Figure 11:
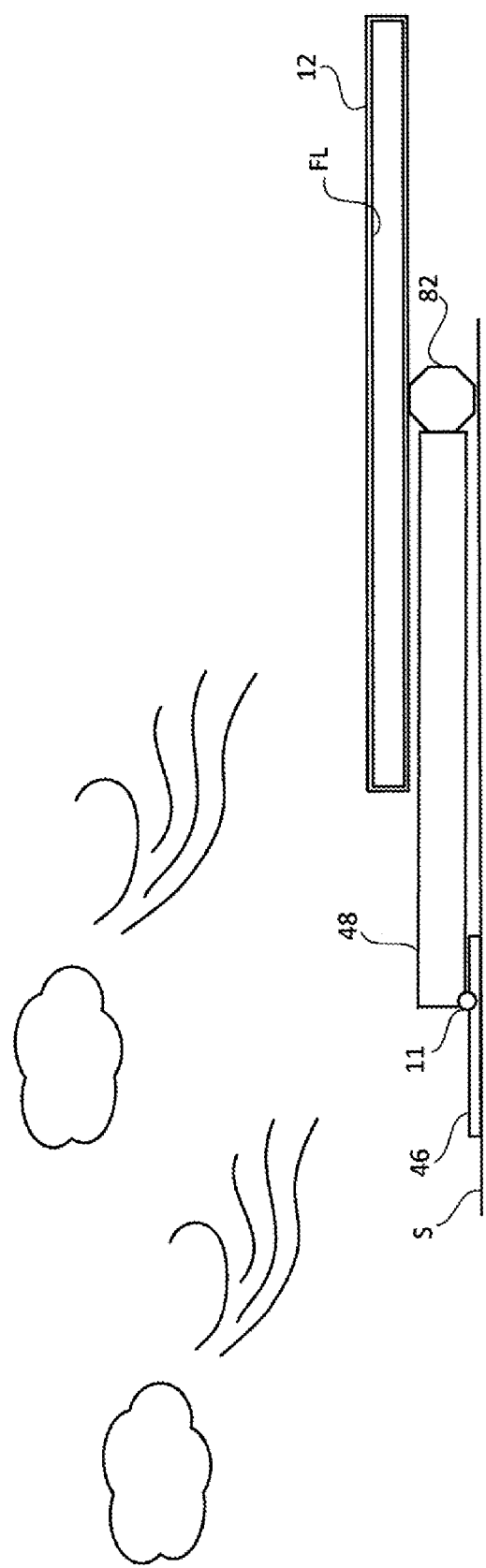
FIG. 11 is a diagram for describing a method for operating the photovoltaic apparatus according to the embodiment of the present invention.

FIG. 11 is a diagram for describing a method for operating the photovoltaic apparatus according to the embodiment of the present invention.

Figure 12:
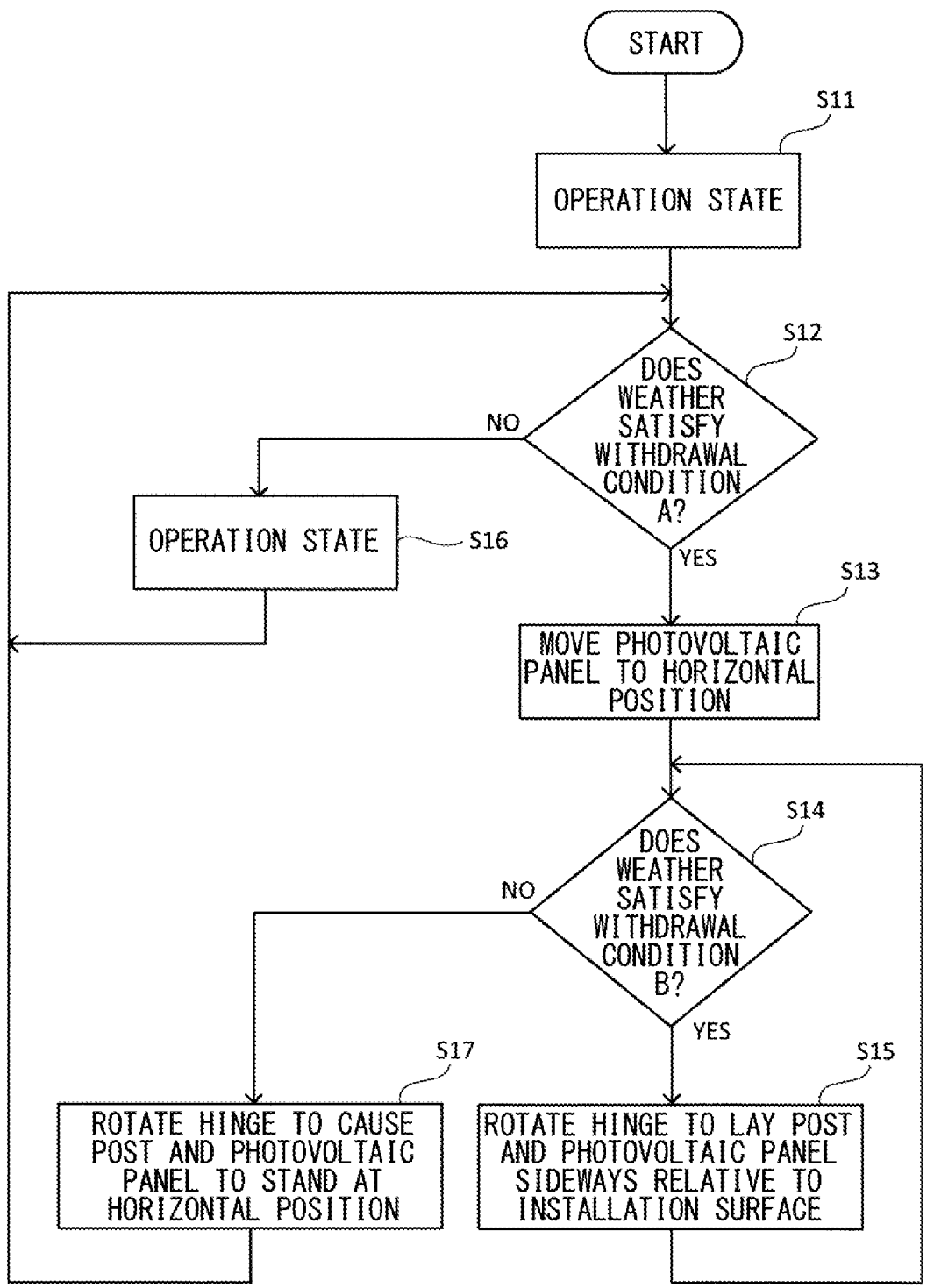
FIG. 12 is a flow chart showing one example of the procedure of the method for operating the photovoltaic apparatus according to the embodiment of the present invention.

FIG. 12 is a flow chart showing one example of the procedure of the method for operating the photovoltaic apparatus according to the embodiment of the present invention.

With reference to FIG. 11 and FIG. 12, first, until the weather satisfies a predetermined withdrawal condition A (NO in step S12), a state where the photovoltaic apparatus 101 is in operation, i.e., a state where the light receiving surface FL of the photovoltaic panel 12 is oriented to the direction of sunlight as shown in FIG. 5, for example, is maintained (step S16).

Next, when the weather satisfies the withdrawal condition A, specifically, for example, when the possibility of occurrence of relatively strong wind "that could affect the support mechanism such as the position changeable part 84 and the photovoltaic panel 12" becomes high (YES in step S12), the elevation drive part 82 is operated to cause the photovoltaic panel 12 to stand in parallel to the installation surface S, i.e., at the horizontal position, that is, the photovoltaic apparatus 101 is caused to enter a withdrawn state A (step S13).

Next, when the weather satisfies a withdrawal condition B, specifically, for example, when the possibility of occurrence of stronger wind "that could not be withstood by the support mechanism such as the position changeable part 84 and the photovoltaic panel 12" becomes high (YES in step S14), the hinge mechanism 11 is rotated to cause the post 48 and the photovoltaic panel 12 to be laid sideways relative to the installation surface S, i.e., disposed horizontally relative to the installation surface S, that is, the photovoltaic apparatus 101 is caused to enter a withdrawn state B. That is, in a state where: in a side view of the photovoltaic apparatus 101, the photovoltaic panel 12 is at an upright position where the longitudinal direction of the photovoltaic panel 12 extends along the extending direction of the post 48; and the post 48 is laid sideways relative to the installation surface S by the hinge mechanism 11, the hinge mechanism 11 can locate the photovoltaic panel 12 such that the light receiving surface FL is oriented upward. It should be noted that in the withdrawn state B, the post 48 may be dismounted from the hinge mechanism 11 (step S15).

Then, until the weather satisfies a predetermined restoration condition B, i.e., for example, until the weather no longer satisfies the withdrawal condition B (YES in step S14), the withdrawn state B of the photovoltaic apparatus 101 is maintained.

Next, when the weather satisfies the predetermined restoration condition B, i.e., for example, when the wind speed has become relatively small and the weather no longer satisfies the withdrawal condition B (NO in step S14), the hinge mechanism 11 is rotated to cause the post 48 and the photovoltaic panel 12 to stand, specifically, the state is restored to the withdrawn state A of the photovoltaic apparatus 101, i.e., a horizontal state in which the photovoltaic panel 12 stands in parallel to the installation surface S (step S17).

Then, until the weather satisfies a predetermined restoration condition A, i.e., for example, until the weather no longer satisfies the withdrawal condition A (YES in step S12), the withdrawn state A of the photovoltaic apparatus 101 is maintained.

Next, when the weather satisfies the predetermined restoration condition A, i.e., for example, when the weather no longer satisfies the withdrawal condition A (NO in step S12), the photovoltaic apparatus 101 is caused to be in operation, i.e., the position changeable part 84 is operated to adjust the elevation and the azimuth of the photovoltaic panel 12, thereby to cause the light receiving surface FL to be oriented to the direction of sunlight (step S16).

As described above, in the method for operating the photovoltaic apparatus 101, when wind has become strong in an operation state, first, the photovoltaic panel 12 is caused to be at the horizontal position, and when wind has become stronger, the hinge mechanism 11 is used to lower the photovoltaic panel 12 and the post 48 to the installation surface S such as the ground surface, thereby causing the photovoltaic panel 12 and the post 48 to be in a horizontally-laid state, i.e., laid-down state.

Near the ground surface, the frictional resistance of the ground is large and the ground serves like a barrier, and thus, the wind speed is smaller than that at several meters above the ground surface. Further, as to the wind direction, the proportion of the component parallel to the ground surface is large.

Therefore, by causing the photovoltaic panel 12 supposed to be several meters or more above the ground surface, to be horizontally disposed at the ground surface, it is possible to cause the photovoltaic panel 12 to be withdrawn into a state where breakage thereof is less likely to occur. Accordingly, damage by strong wind can be avoided.

Then, after the strong wind has gone, the state can be restored to the original operation state, manually or by extending the power cylinder, the linear actuator, or the like.

As described above, during a storm, the photovoltaic panel 12 can be laid horizontally near the ground surface in a short time, and then, after the storm has gone, the state can be quickly restored to the operation state. Thus, loss in power generation of the photovoltaic apparatus 101 can be suppressed at minimum.

Figure 13:
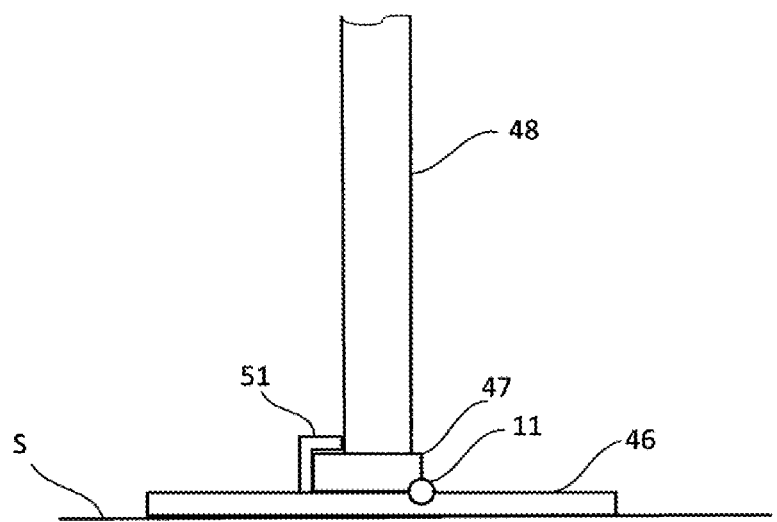
FIG. 13 is a diagram schematically showing a configuration of a modification of the photovoltaic apparatus according to the embodiment of the present invention.

FIG. 13 is a diagram schematically showing a configuration of a modification of the photovoltaic apparatus according to the embodiment of the present invention.

With reference to FIG. 13, compared with the photovoltaic apparatus 101, the modification of the photovoltaic apparatus 101 further includes a fastener 51, and the post 48 has a wide portion 47.

The wide portion 47 is formed at a lower portion of the post 48, and forms a lower end portion of the post 48. That is, the hinge mechanism 11 is provided between the wide portion 47 and the base 46, for example. More specifically, the hinge mechanism 11 couples and rotates the wide portion 47 and the base 46 together, thereby displacing the post 48.

The fastener 51 is provided at the opposite side to the hinge mechanism 11 with respect to the post 48. The fastener 51 fixes the post 48 at the opposite side to the hinge mechanism 11 with respect to the post 48.

Specifically, the fastener 51 is a fixing hook, for example, and prevents rotation of the hinge mechanism 11 in the operation state of the photovoltaic apparatus 101. Accordingly, the post 48 can be stably fixed to the base 46. The fastener 51 can rotate in a direction reverse to the rotation direction of the hinge mechanism 11.

Figure 14:
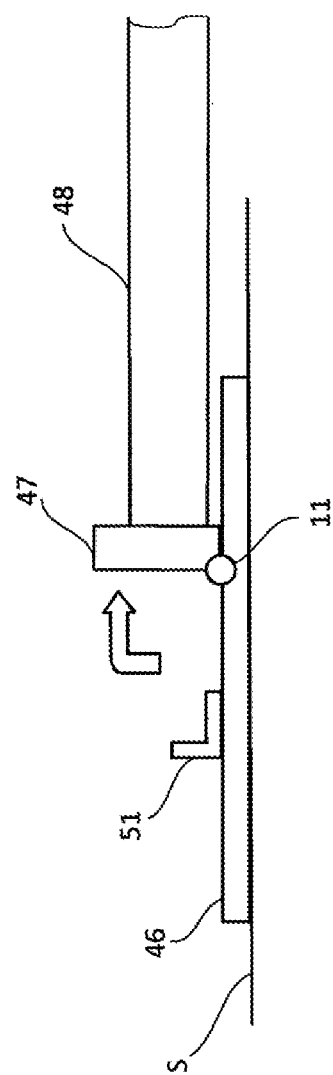
FIG. 14 is a diagram showing a state in which a fastener is disengaged in the modification of the photovoltaic apparatus according to the embodiment of the present invention.

FIG. 14 is a diagram showing a state in which the fastener is disengaged in the modification of the photovoltaic apparatus according to the embodiment of the present invention.

With reference to FIG. 14, when wind is strong, the fastener 51 is disengaged, more specifically, the fastener 51 is rotated to be located at the base 46, whereby prevention of rotation of the hinge mechanism 11 is canceled, and accordingly, the post 48 can be laid sideways relative to the installation surface S. In a case where the photovoltaic apparatus 101 includes the expansion/contraction mechanism 45, the post 48 is laid sideways relative to the installation surface S, by contracting the expansion/contraction mechanism 45.

Meanwhile, in the case of a photovoltaic apparatus in which a power generation part is supported by a post, such as in the photovoltaic apparatuses described in PATENT LITERATURE 1 and 2, it is necessary to use a machine such as a crane in order to mount, to an upper portion of the post, a photovoltaic panel which has been assembled at an installation site and which is to serve as the power generation part. This requires a long work time. Thus, the work cost and the machine procurement cost are increased.

In addition, in the technology described in PATENT LITERATURE 1, when the wind speed has exceeded a predetermined value, the angle of the photovoltaic panel is changed so that the photovoltaic panel takes a substantially horizontal attitude, whereby influence of wind pressure is reduced.

However, in the case of the photovoltaic apparatus described in PATENT LITERATURE 1, since the photovoltaic panel is mounted to an upper portion of the post, merely causing the photovoltaic panel to take a substantially horizontal attitude may not provide sufficient protection in some cases.

In contrast to this, in the photovoltaic apparatus according to the embodiment of the present invention, the elevation drive part 82 supports the photovoltaic panel 12 so as to be able to change the elevation of the photovoltaic panel 12. The post 48 supports the photovoltaic panel 12 and the elevation drive part 82. The hinge mechanism 11 supports the post 48 so as to be able to change the angle of the post 48 relative to the installation surface S for the photovoltaic apparatus 101.

This configuration allows the inclination angle of the post 48 to be changed and also allows the elevation of the photovoltaic panel 12 to be changed. Thus, the position at which the post 48 and the photovoltaic panel 12 are laid sideways relative to the installation surface S, and the position at which the post 48 and the photovoltaic panel 12 are caused to stand can be easily taken.

Accordingly, for example, in a state of the power generation module 10 having a size easy to handle, a necessary number of the power generation modules 10 are carried to an installation site, and then, the power generation modules 10 are assembled at the post 48 laid sideways relative to the installation surface S. Thus, the photovoltaic panel 12 can be easily mounted to the post 48 without using a large crane and the like.

In addition, for example, from the assembling of the photovoltaic panel 12 to the mounting of the photovoltaic panel 12 to the position changeable part 84 mounted to the post 48 can be performed at once at the installation site.

That is, the photovoltaic apparatus 101 does not require large machines and heavy equipment which have been necessary for loading the entirety of the photovoltaic panel 12 to the post 48.

In addition, for example, in a case where the entirety of the photovoltaic panel 12 is completed at a factory, the photovoltaic panel 12 can be mounted to the post 48 laid sideways relative to the installation surface S, by use of a small crane, a forklift, and the like which perform unloading from a truck.

Thus, with the photovoltaic apparatus 101, the load at the construction work and the load at the assembling work during installation can be reduced. In addition, during maintenance such as module replacement, heavy equipment such as a crane and a vehicle for work at height are not required.

By use of the hinge mechanism 11 and the elevation drive part 82, the photovoltaic panel 12 and the post 48 can be lowered to the installation surface S such as the ground surface, to be laid sideways, for example.

That is, by causing the photovoltaic panel 12 supposed to be several meters or more above the ground surface, for example, to be horizontally disposed at the ground surface, it is possible to cause the photovoltaic panel 12 to be withdrawn into a state where breakage thereof is less likely to occur. Accordingly, damage by strong wind can be avoided.

Then, after the strong wind has gone, the state can be restored to the original operation state, by rotating the hinge mechanism 11 and by adjusting the angle by means of the elevation drive part 82.

As described above, during a storm, the photovoltaic panel 12 can be laid sideways relative to the installation surface S in a short time, and after the storm has gone, the state can be quickly restored to the operation state. Thus, loss in power generation of the photovoltaic apparatus 101 can be suppressed at minimum.

Thus, with the photovoltaic apparatus according to the embodiment of the present invention, simplification of installation work and stable operation can be realized in a configuration in which the power generation part is supported by the post.

In addition, for example, regions suitable as installation places of the photovoltaic apparatus are deserts and the like with little rain in general. In such a region, sand attaches to the surfaces of the lenses of the photovoltaic panel, causing decrease in the power generation amount. Thus, periodic cleaning maintenance for removing sand is necessary.

However, in the case of general photovoltaic apparatuses, it is necessary to perform work at a high place by use of, for example, a vehicle for work at height and a car gondola having a similar shape to that used for building maintenance, or it is necessary to perform cleaning by high-pressure cleaning from the ground. In deserts or the like, water is precious, and such work is not desirable.

In contrast to this, in the case of the photovoltaic apparatus 101, by use of the hinge mechanism 11 and the elevation drive part 82, the photovoltaic panel 12 and the post 48 can be lowered to the installation surface S such as the ground surface, and cleaning can be performed in a state where the photovoltaic panel 12 and the post 48 are laid sideways, for example. Thus, the amount of water to be used is small, and the work is light work.

Thus, with the photovoltaic apparatus according to the embodiment of the present invention, maintenance such as removing sand and dust from the surfaces of the lenses of the photovoltaic panel can be further facilitated.

In the photovoltaic apparatus according to the embodiment of the present invention, the base 46 is provided at the installation surface S. The hinge mechanism 11 is provided between a lower portion of the post 48 and the base 46.

With this configuration, the hinge mechanism 11 can be provided at an appropriate position in the photovoltaic apparatus 101, and the function of the hinge mechanism 11 can be more preferably exerted.

In the photovoltaic apparatus according to the embodiment of the present invention, the photovoltaic panel 12 has the light receiving surface FL. The tracking control section performs controls by use of the elevation drive part 82 such that the light receiving surface FL is oriented to the direction of the sun.

With this configuration, the tracking mechanism of the photovoltaic panel 12 provided for the purpose of increasing the power generation amount can be used also for the purpose of realizing simplification of installation work and stable operation, and thus, can be used effectively.

In addition, in the photovoltaic apparatus according to the embodiment of the present invention, the expansion/contraction mechanism 45 is capable of expanding/contracting along the direction of displacement of the post 48 caused by the hinge mechanism 11, and supports the post 48.

With this configuration, the inclination angle of the post 48 can be easily set to any angle. In addition, for example, the post 48 and the photovoltaic panel 12 can be easily caused to stand from a state where the post 48 and the photovoltaic panel 12 are laid sideways relative to the installation surface S.

In the method for installing the photovoltaic apparatus according to the embodiment of the present invention, first, the post 48 having the hinge mechanism 11 mounted thereto is laid sideways relative to the installation surface S for the photovoltaic apparatus 101. Next, the photovoltaic panel 12 is mounted to the post 48 that has been laid sideways. Next, the hinge mechanism 11 is rotated to cause the post 48 to stand.

Thus, by changing the inclination angle of the post 48, a position at which the post 48 is laid sideways relative to the installation surface S, and a position at which the post 48 is caused to stand can be easily taken.

Accordingly, for example, in a state of the power generation module 10 having a size easy to handle, a necessary number of the power generation modules 10 are carried to an installation site, and then, the power generation modules 10 are assembled at the post 48 laid sideways relative to the installation surface S. Thus, the photovoltaic panel 12 can be easily mounted to the post without using a large crane and the like.

In addition, for example, from the assembling of the photovoltaic panel 12 to the mounting of the photovoltaic panel 12 to the position changeable part 84 mounted to the post 48 can be performed at once in the installation site.

That is, the photovoltaic apparatus 101 does not require large machines and heavy equipment which have been necessary for loading the entirety of the photovoltaic panel 12 to the post 48.

In addition, for example, in a case where the entirety of the photovoltaic panel 12 is completed at a factory, the photovoltaic panel 12 can be mounted to the post 48 laid sideways relative to the installation surface S, by use of a small crane, a forklift, and the like which perform unloading from a truck.

Thus, with the photovoltaic apparatus 101, the load at the construction work and the load at the assembling work during installation can be reduced.

Thus, in the method for installing the photovoltaic apparatus according to the embodiment of the present invention, simplification of installation work can be realized in a configuration in which the power generation part is supported by the post.

In the method for installing the photovoltaic apparatus according to the embodiment of the present invention, during maintenance such as cleaning and module replacement, heavy equipment such as a crane and a vehicle for work at height are not required.

Specifically, for example, regions suitable as installation places of the photovoltaic apparatus are deserts and the like with little rain in general. In such a region, sand attaches to the surfaces of the lenses of the photovoltaic panel, causing decrease in the power generation amount. Thus, periodic cleaning maintenance for removing sand is necessary.

However, in the case of general photovoltaic apparatuses, it is necessary to perform work at a high place by use of, for example, a vehicle for work at height and a car gondola having a similar shape to that used for building maintenance, or it is necessary to perform cleaning by high-pressure cleaning from the ground. In deserts or the like, water is precious, and such work is not desirable.

In contrast to this, in the case of the photovoltaic apparatus 101, by use of the hinge mechanism 11 and the elevation drive part 82, the photovoltaic panel 12 and the post 48 can be lowered to the installation surface S such as the ground surface, and cleaning can be performed in a state where the photovoltaic panel 12 and the post 48 are laid sideways, for example. Thus, the amount of water to be used is small, and the work is light work.

Thus, with the method for operating the photovoltaic apparatus according to the embodiment of the present invention, maintenance such as removing sand and dust from the surfaces of the lenses of the photovoltaic panel can be further facilitated.

In the method for operating the photovoltaic apparatus according to the embodiment of the present invention, first, in a state where the post 48 having the hinge mechanism 11 mounted thereto and supporting the photovoltaic panel 12 stands at the installation surface S, and when the weather satisfies a predetermined withdrawal condition, the hinge mechanism 11 is rotated to cause the post 48 to be laid sideways relative to the installation surface S for the photovoltaic apparatus 101. Next, when the weather satisfies a predetermined restoration condition, the hinge mechanism 11 is rotated so as to cause the post 48 having been laid sideways to stand at the installation surface S.

Thus, by changing the inclination angle of the post 48, a position at which the post 48 is laid sideways relative to the installation surface S, and a position at which the post 48 is caused to stand can be easily taken.

By use of the hinge mechanism 11, the photovoltaic panel 12 and the post 48 can be lowered to the installation surface S such as the ground surface, for example.

That is, by causing the photovoltaic panel 12 supposed to be several meters or more above the ground surface, for example, to be disposed near the ground surface, it is possible to cause the photovoltaic panel 12 to be withdrawn into a state where breakage thereof is less likely to occur. Accordingly, damage by strong wind can be avoided.

Then, after the strong wind has gone, the state can be restored to the original operation state by rotating the hinge mechanism 11.

As described above, during a storm, the photovoltaic panel 12 can be moved to the vicinity of the installation surface S in a short time, and after the storm has gone, the state can be quickly restored to the operation state. Thus, loss in power generation of the photovoltaic apparatus 101 can be suppressed at minimum.

Thus, with the method for operating the photovoltaic apparatus according to the embodiment of the present invention, stable operation can be realized in a configuration in which the power generation part is supported by the post.

It should be noted that the photovoltaic apparatus according to the embodiment of the present invention is a concentrator photovoltaic apparatus, but is not limited thereto. The photovoltaic apparatus may be of another type as long as the photovoltaic apparatus has a configuration in which a power generation part such as a photovoltaic panel is supported by a post.

However, with respect to concentrator photovoltaic apparatus in which sunlight is converged to power generating elements by use of lenses and the like thereby increasing the power generation efficiency of the power generating elements, there are many cases where, for example, a photovoltaic panel is mounted to the distal end of the post, and a mechanism is provided that is capable of controlling the light receiving surface of the photovoltaic panel so as to be oriented to the direction of the sun. Thus, the effect obtained by applying the present invention is large in particular.

It should be noted that the embodiment above is merely illustrative and not restrictive in all aspects. The scope of the present invention is defined by the scope of the claims rather than the meaning described above, and is intended to include meaning equivalent to the scope of the claims and all modifications within the scope.

The above description includes the features in the additional notes below.

[Additional Note 1]

A photovoltaic apparatus comprising:

a power generation part;

an angle changeable mechanism configured to support the power generation part so as to be able to change an elevation of the power generation part;

a post configured to support the power generation part and the angle changeable mechanism; and a hinge mechanism configured to support the post so as to be able to change an angle of the post relative to an installation surface for the photovoltaic apparatus, wherein the power generation part has a plate-like shape as a whole, the power generation part having a light receiving surface and a back surface located at an opposite side to the light receiving surface, the angle changeable mechanism supports the power generation part at the back surface side, the angle changeable mechanism being capable of locating the power generation part at an upright position where, in a side view of the photovoltaic apparatus, a longitudinal direction of the power generation part extends along an extending direction of the post, and in a state where the power generation part is at the upright position and the post is laid sideways relative to the installation surface by the hinge mechanism, the hinge mechanism is capable of locating the power generation part such that the light receiving surface is oriented upward.

The hinge mechanism is one example, and is a rotation mechanism in a general meaning. For example, in FIG. 5, the hinge mechanism may be a rotation mechanism configured such that a cylindrical-shaped pin is fixed to either one of the post 48 and the base 46, and a pin receiver is fixed to the other of the post 48 and the base 46. The pin receiver holds the pin while receiving the rotation of the pin about the axis thereof as a sliding movement.

The rotation mechanism is provided at a portion near the root at the installation surface side of the post 48 (for example, the portion where the hinge mechanism 11 is provided in FIG. 5), and rotatably holds the post 48 with the portion used as the fulcrum, thereby allowing selection between a high-attitude state in which the post 48 stands (for example, FIGS. 5, 6, and 10), and a low-attitude state in which the post 48 is laid sideways along the installation surface S together with the photovoltaic panel 12 (for example, FIGS. 8 and 11).

Therefore, the photovoltaic apparatus can also be expressed as follows.

[Additional Note 2]

A photovoltaic apparatus comprising:

a photovoltaic panel configured to receive sunlight and generate power;

an angle changeable mechanism configured to support the photovoltaic panel so as to be able to change an elevation and an azimuth of the photovoltaic panel relative to the sun;

a post configured to support the photovoltaic panel and the angle changeable mechanism from an installation surface; and a rotation mechanism provided at a portion near a root at an installation surface side of the post, the rotation mechanism configured to rotatably hold the post with the portion used as a fulcrum, thereby allowing selection between a high-attitude state in which the post stands, and a low-attitude state in which the post is laid sideways along the installation surface together with the photovoltaic panel.

REFERENCE SIGNS LIST 10 power generation module
11 hinge mechanism
12 photovoltaic panel (power generation part)
13 housing
14 power generating element
15 flexible printed circuit
16 Fresnel lens
17 light receiving part
18 conductive part
40 pedestal
45 expansion/contraction mechanism
46, 49 base
47 wide portion
48 post
51 fastener
80 frame part
82 elevation drive part
83 azimuth drive part
84 position changeable part
90 function box
101 photovoltaic apparatus
FL light receiving surface
FS back surface
Fo main surface
S installation surface

The invention claimed is:

1. A photovoltaic apparatus comprising:

a power generation part;

an angle changeable mechanism configured to support the power generation part so as to be able to change an elevation of the power generation part;

a post configured to stand at an installation surface for the photovoltaic apparatus and to support the power generation part and the angle changeable mechanism at a distal end of the post;

a hinge mechanism provided at a lower end portion of the post and configured to support the post so as to be able to change an angle of the post relative to the installation surface; and a base provided at the installation surface, wherein the hinge mechanism is provided between a lower portion of the post and the base, the photovoltaic apparatus further comprises an expansion/contraction mechanism capable of expanding/contracting along a direction of displacement of the post caused by the hinge mechanism, the expansion/contraction mechanism configured to support the post, the power generation part has a light receiving surface, and the photovoltaic apparatus further comprises a tracking control section configured to perform control by use of the angle changeable mechanism such that the light receiving surface is oriented to a direction of the sun.

2. A photovoltaic apparatus comprising:

a power generation part;

an angle changeable mechanism configured to support the power generation part so as to be able to change an elevation of the power generation part;

a post configured to stand at an installation surface for the photovoltaic apparatus and to support the power generation part and the angle changeable mechanism at a distal end of the post; and a hinge mechanism provided at a lower end portion of the post and configured to support the post so as to be able to change an angle of the post relative to the installation surface, wherein the power generation part has a light receiving surface, and the photovoltaic apparatus further comprises a tracking control section configured to perform control by use of the angle changeable mechanism such that the light receiving surface is oriented to a direction of the sun, and an expansion/contraction mechanism capable of expanding/contracting along a direction of displacement of the post caused by the hinge mechanism, the expansion/contraction mechanism configured to support the post.

* * * * *